United States Patent [19]

Gallo

[11] 4,037,577

[45] July 26, 1977

[54] AUTO IGNITION SYSTEM

[76] Inventor: Michael R. Gallo, 3733 Quarton Road, Bloomfield Hills, Mich. 48033

[21] Appl. No.: 486,635

[22] Filed: July 8, 1974

[51] Int. Cl.² .......................... F02P 1/00; F02P 5/04
[52] U.S. Cl. ........................ 123/148 E; 123/117 R; 123/146.5 A; 123/117 D
[58] Field of Search ........ 123/148 F, 148 OC, 117 R, 123/148 S

[56] References Cited

U.S. PATENT DOCUMENTS

| | | | |
|---|---|---|---|
| 3,139,876 | 7/1964 | Jukes | 123/148 E |
| 3,203,412 | 8/1965 | Kuritza | 123/148 E |
| 3,241,538 | 3/1966 | Hugenholtz | 123/148 E |
| 3,277,340 | 10/1966 | Jukes | 123/148 E |
| 3,375,812 | 4/1968 | Koda | 123/148 E |
| 3,478,249 | 11/1969 | Jukes | 123/148 E |
| 3,621,826 | 11/1971 | Chrestensen | 123/148 E |
| 3,675,635 | 7/1972 | Graser | 123/148 E |
| 3,678,224 | 7/1972 | Takeda | 123/148 E |
| 3,689,753 | 9/1972 | Williams | 123/117 R |
| 3,749,474 | 7/1973 | Kissel | 123/148 E |
| 3,837,325 | 9/1974 | Minks | 123/148 E |
| 3,855,983 | 12/1974 | Valek | 123/148 E |

Primary Examiner—C. J. Husar
Assistant Examiner—Ronald B. Cox
Attorney, Agent, or Firm—Krass & Young

[57] ABSTRACT

Automotive distributor apparatus for replacing the standard mechanical breaker points and including a molded plastic rotor cap adapted to fit onto a rotor cap plate in the same manner as a standard rotor cap and having a skirt portion with molded-in, circumferentially arranged metallic teeth. A coil pair is placed on the stator support plate in a preformed locator hole. The coils of the pair are radially spaced so that the rotor cap skirt extends into the air gap therebetween. An output circuit for receiving the timing pulses generated by rotation of the cap between the coils is also disclosed. The circuit comprises a tuned circuit including a manually or electronically variable resistor for varying distributor dwell angle. An Anti-theft device and an individual cylinder timing system is disclosed.

4 Claims, 10 Drawing Figures

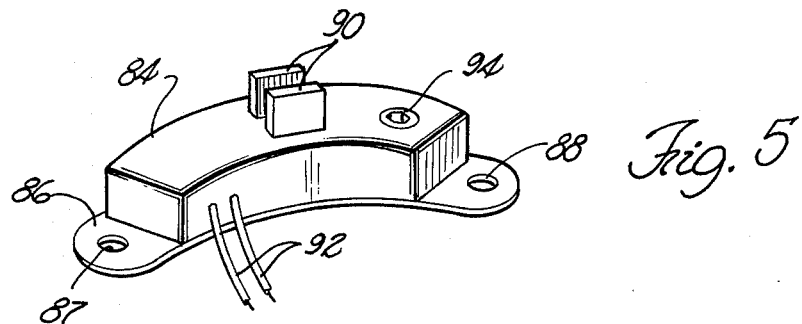
Fig. 5
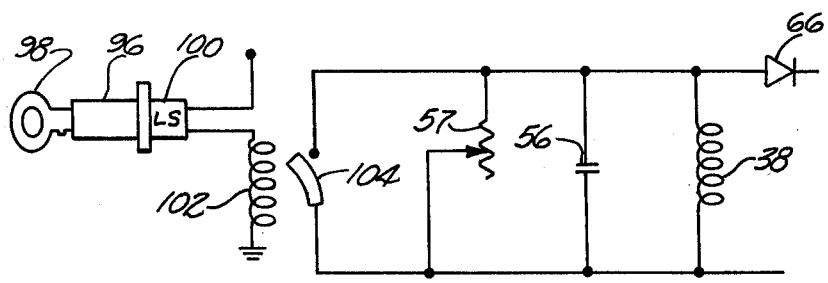
Fig. 6
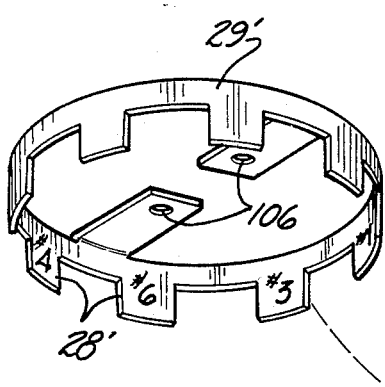
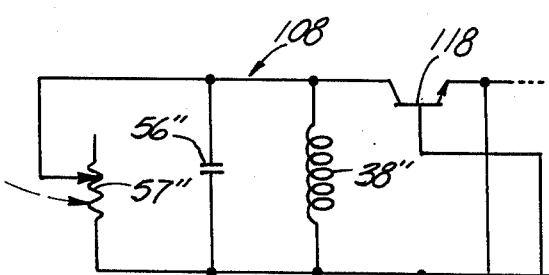
Fig. 7
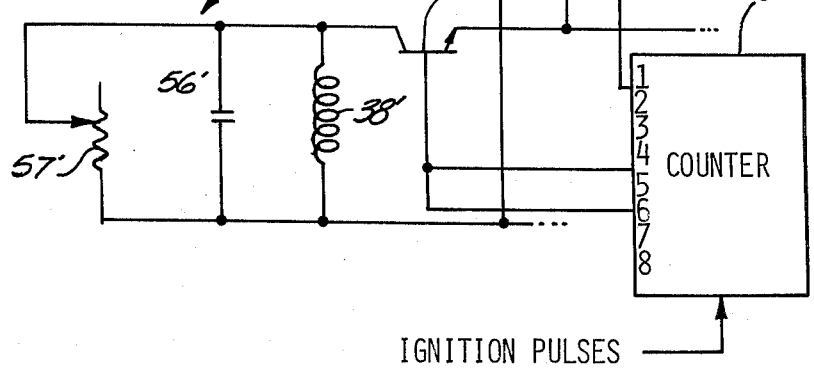
IGNITION PULSES

AUTO IGNITION SYSTEM

INTRODUCTION

This invention relates to automobile ignition systems and particularly to an apparatus which is compatible with the standard distributor assembly for replacing the mechanical breaker points thereof.

BACKGROUND OF THE INVENTION

The standard automobile distributor typically comprises a stator in the form of a cast housing, a support member, such as a plate, within the housing for carrying such elements as the breaker points, condensor and wiper, a rotor shaft extending through the housing and through the support plate, and a rotor assembly which is carried by the shaft. The breaker points which are mounted within the housing comprise a spring biased arm carrying one of two metallic electrodes which intermittently contact one another as an octagonal cam on the distributor shaft rotates past and in contact with the arm. In this fashion, ignition timing pulses are generated in proportion to engine speed.

This well known prior art breaker points design has provided reasonable satisfactory service for years. However, it is well known that the mechanical breaker points deteriorate with time until ignition performance is so poor that the breaker points must be replaced. Such deterioration is due partly to the foul atmospher in which the distributor is normally located, but is due largely to the physical deterioration of the electrode surfaces which results from the transfer of electrical impulses between two surfaces over long period of time. This deterioration affects not only engine performance, but gas mileage and exhaust emission levels.

To alleviate the aforementioned problems which do not use the mechanical-contacting breaker points, there have developed in the prior art an electromagnetic apparatus for generating ignition timing pulses by passing a metallic rotor through an air gap between a pair of inductively linked coils. The rotor of such an electromagnetic system operates as a shutter or interrupter and has a plurality of circumferentially spaced conductive teeth. This shutter is normally secured to the distributor rotor shaft in a predetermined angular position relative to the coils which are carried by the stator or nonrotating portion of the distributor assembly. To install the shutter member and coil set into the distributor normally involves careful placement so as to ensure that the proper timing is achieved. Many of the prior art disclosures at least suggest that a completely customized distributor assembly is required. Accordingly, installation does not appear to be easily carried out by the ordinary automobile owner. Moreover, such prior art ignition systems, while doing away with breaker points, remain totally dependent on vacuum-type spark advance devices to vary dwell angle or engine timing under all conditions.

BRIEF SUMMARY OF THE INVENTION

My invention comprises an ignition timing signal generator of the nonmechanical, electromagnetic type for replacing the standard breaker points, this assembly preferably but not necessarily being of the design set forth in my copending application S. N. 274,357 now U.S. Pat. No. 3,822,686 filed July 24, 1972, so as to afford the advantages of rapid and simple installation as well as complete compatibility with existing distributor design. In addition, I now provide electronic means for varying engine timing or dwell angle.

In a specific embodiment, my invention is carried out by way of the fabrication of a rotor cap which is adapted to be mounted on a standard distributor shaft as a replacement for the standard rotor cap, said improvement rotor cap comprising a skirted body of dielectric material, such as phenolic plastic, and interrupter which is fixedly bonded such as by molding into the skirted portion of the cap. The interrupter comprises a plurality of uniformly spaced metallic teeth which are disposed in a circumferential pattern. The electromagnetic breaker points assembly further comprises a coil set which is adapted for ready installation on a stator element, such as a standard distributor stator support plate. The system further comprises a pulse forming circuit such as a blocking oscillator, the pulse timing from which is controlled by means of a tuneable RLC network in which the resistive component is variable. This permits initial timing to be easily set and later reset as desired. It also permits timing control from various sources in addition to engine vacuum.

In the preferred form, the interrupter band is a continuous band of thin metal having integral therewith a plurality of depending teeth. This interrupter element may be encapsulated by the thermosetting plastic material of the rotor cap or it may be totally separate therefrom.

As will be apparent to those skilled in the art, the passage of the spaced teeth of the interrupter between a pair of inductively linked coils produces a modulation or variation in the inductive link which gives rise to a time-varying reactance in the circuit which comprises the two coils. In one preferred form, the two coils form a feedback circuit for a blocking oscillator so as to modulate the condition of oscillation in a sequence and at a rate related to engine speed thereby to generate timing signals. The blocking oscillator then drives additional pulse forming and shaping circuitry which in turn drives a final output stage, such as an SCR, to provide ignition pulses which are applied to the coil primary in the standard ignition system. Other forms of circuitry responsive to the signals generated in the spaced coils are well known and may be selected as alternatives to the circuit described herein. My invention further comprises an anti-theft system whereby, unless a key is inserted fully into the ignition lock, engine timing is so substantially de-tuned as to prevent the engine from starting. In general, this is accomplished by means responsive to key insertion to establish the operation of a timing circuit in the ignition circuit whereby normal engine operation may be obtained.

This anti-theft system is augmented and enhanced by encapsulating the ignition system pulse-forming electronics so that attempts to remove or vary control components result in destruction, this disabling the vehicle.

Another feature of my invention is a means for identifying each tooth of the interrupter band with a separate tuned circuit condition such that one may individually vary the ignition timing for each cylinder of a multi-cylinder engine.

BRIEF DESCRIPTION OF THE DRAWINGS

FIG. 5 is a perspective view of an encapsulated circuit for the embodiment of FIG. 4 of a variation thereof;

FIG. 6 is a circuit illustrative of my anti-theft device;

FIG. 7 is a perspective view of a modified interrupter band in combination with the separate and individual cylinder timing circuits;

DETAILED DESCRIPTION OF THE PREFERRED EMBODIMENT

Figure 1:
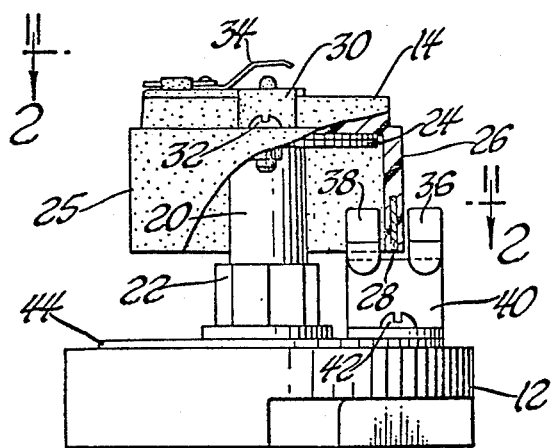
FIG. 1 is a side view of a distributor with parts cut away to illustrate the installation of the improvement of the present invention.
Figure 2:
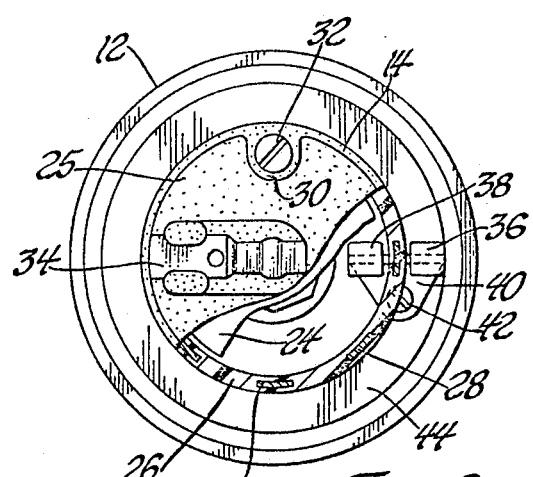
FIG. 2 is a top view of the distributor of FIG. 1, again with parts cut away to illustrate the interior design of the preferred embodiment of the invention.

Referring to FIGS. 1 and 2, there is shown a distributor 10 for an automotive ignition system and comprising a stator in the form of a cast housing 12 and a rotor assembly 14 including an elongated shaft 16 which is rotatable relative to the stator housing 12 about a longitudinal axis. Rotor shaft 16 carries at the lower end thereof as seen in FIG. 1 a gear 18 which is driven by the automobile engine so as to rotate the rotor assembly 14 at a speed which is directly proportional to engine speed.

At the upper or inner end of the rotor shaft 16, as shown on FIG. 1, a portion 20 of reduced diameter extends through and rotates with an octagonal cam 22 which, in the standard distributor arrangement, operates to open and close the mechanical breaker points but which in the present assembly serves no operational function. The reduced diameter portion 20 of rotor shaft 16 also carries a rotor cap support plate 24 to which a cup-shaped distributor rotor cap 25 of molded thermo setting plastic, preferably a phenolic plastic having high heat resistance, is secured.

In accordance with the present invention, the rotor cap 25 comprises a long skirt 26 of relatively thin walled design and which covers most of the interior components of the distributor assembly and further carries encapsulated therein a plurality of metallic interrupter teeth 28. The interrupter teeth 28 are circumferentially disposed around the skirt 26 in uniformly-spaced relation and are typically present in a number which is equal to the number of cylinders in the engine which accommodates the distributor 10; i.e., the typical eightcylinder automotive engine requires eight uniformly-spaced metallic interrupter teeth 28.

Also in accordance with the present invention, the improved rotor cap 25 has formed in the dome portion thereof a pair of substantially diametrically opposed arcuate recesses 30 which accommodate fastener screws 32 for securing the rotor cap assembly 14 to the rotor support plate 24 in exactly the same angular and axial position as was previously occupied by the standard rotor cap, assuming, of course, that rotor cap 25 is installed as a replacement part. The domed portion of rotor cap 25 also carries a central, radially-extending, spring- biased contact 34 for receiving the stepped up ignition voltage pulses from the ignition system coil and for distributing the pulses to the engine cylinders by way of a standard external distributor cap, not shown. Accordingly, the contact 34 and its location on the improvement rotor cap 25 is identical to that of a standard rotor cap in the distributor having standard mechanical breaker points.

Distributor 10 further comprises a pair of inductively linked and radially-spaced wound wire coils 26 and 38 mounted on a stator support plate 44 by means of a L-shaped bracket 40 and a screw 42. The screw 42 is preferably designed to be received by a preexisting hole in the standard stator support plate 44, such preexisting hole being present for the standard location of the breaker points, or condenser or other standard distributor element.

As best shown in FIG. 2, the bracket 40 carries the coils 36 and 38 in such a position as to define an air gap therebetween. Moreover, the position of the skirt 26 of the replacement distributor rotor cap 25, when mounted on the plate 24, is such as to cause the lower extremity of the skirt and the interrupter teeth 28 to rotate continuously through the air gap between the coils 36 and 38, thus, to modulate the inductive link between the coils. This modulation, of course, occurs at a speed which is proportional to engine speed, thus, to produce ignition timing signals.

Figure 3:
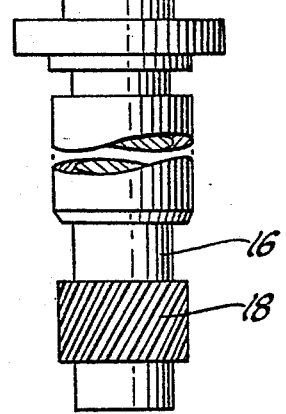
FIG. 3 is a perspective view of an interrupter element useable in conjunction with the embodiment of FIG. 1.

Looking now to FIG. 3, the interrupter teeth 28 are preferably formed as depending parts of an integral interrupter band 29 of very thin metal, such as aluminum or copper. The interrupter band 29 with its depending teeth 28 are molded into and encapsulated by a thermo setting phenolic plastic in the fabrication of the rotor cap 25 of the present invention and as such are fixedly mounted in a predetermined position relative to the rotor cap 25 and, thus, relative to the predetermined location of the fastener screws 32 which secure the rotor cap to the rotor plate 24 in the standard distributor. This molding process is known as "insert molding" and is a form of injection molding well known to those skilled in the molding art. As an alternative to the integral design shown in FIG. 3, the teeth 28 may be formed separately and separately molded into or bonded to the interior of the rotor cap 25, this and other alternative securement techniques being useable so long as the end result is a plurality of interrupter teeth fixedly carried by the skirt portion of the rotor cap 25 so as to occupy a predetermined physical position relative to the cap and to its fastener means.

The installation of the distributor componenets of the present invention may be quickly and easily carried out simply by removing the external distributor cap in the standard fashion and thence removing the rotor cap which is the standard counterpart of the improvement rotor cap shown herein. Removal of the cap is accomplished by the removal of the diametrically opposite screws which fasten the standard rotor cap to the standard rotor cap support plate 24. The standard rotor cap is then removed in its entirety and replaced with the improvement rotor cap 25 simply be replacing the screws 32 in the standard fastener holes. Before installing the improvement cap 25, the bracket 40 carrying the coils 36 and 38 is secured in a predetermined position on the stator plate 44, this predetermined position being established by means of a support fastener hole which is formed into the stator support plate 44 to carry some other component in the standard assembly. With the improvement rotor cap 25 then installed, the skirt 26 extends down between the spaced coils 36 and 38. The external rotor cap may then be reinstalled. Accordingly, the conversion of the distributor 10 itself involves only the removal and replacement of a few simple screw fasteners.

Figure 4:
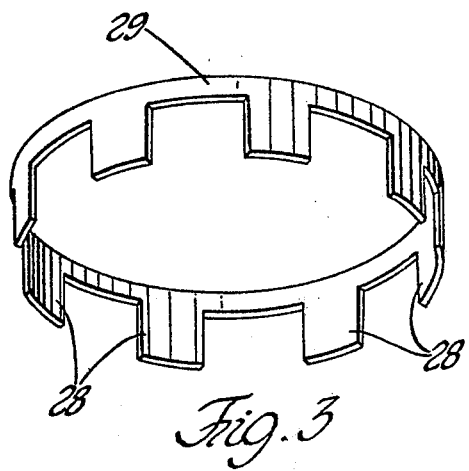
FIG. 4 is a schematic circuit diagram of a pulse- forming circuit which is useable with the apparatus of FIGS. 1 through 3.
Figure 4:
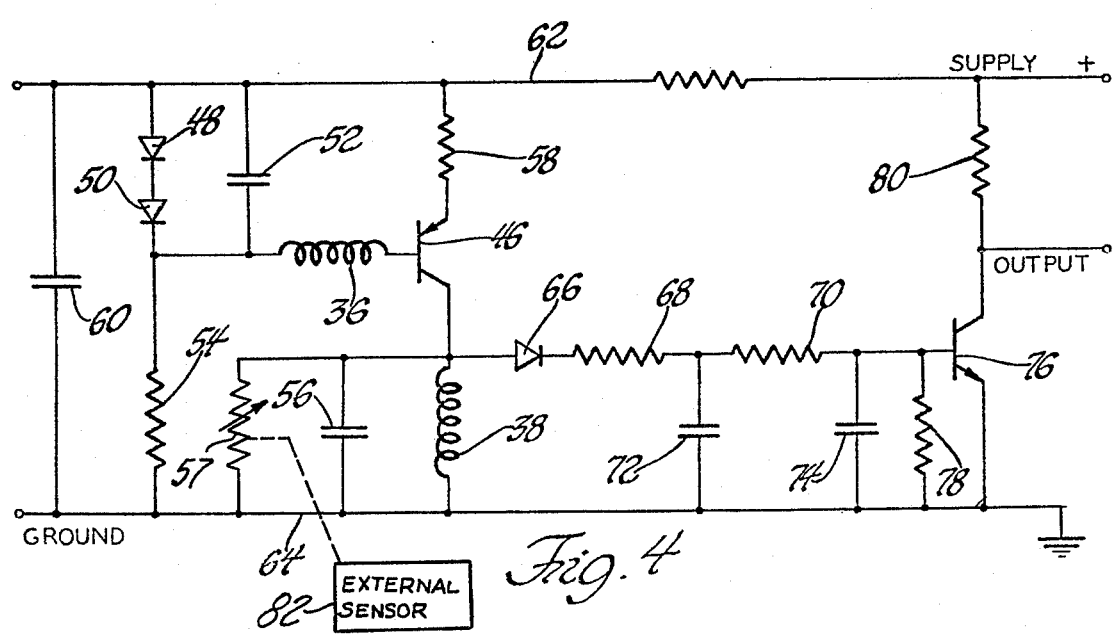

Looking now to FIG. 4, an illustrative pulse-forming circuit for use in conjunction with the electromagnetic timing signal generator of the present invention comprises an oscillator- transistor 46 comprising base, emitter and collector electrodes, the base electrode being connected to one end of coil 36 and the collector electrode being connected to one end of coil 38. The other end of coil 36 is connected to the positive terminal of a supply source through a pair of diodes 48 and 50, the series combination of the diodes being interconnected with a parallel or shunt capacitor 52. Said other end of coil 36 is also connected ground through a bias resistor 54. The other end of coil 38 is connected to ground as shown in FIG. 4. The combination of a capacitor 56 and a variable resistor 57 is connected in shunt relation to the coil 38. The emitter electrode is connected to the supply voltage through a current limiting resistor 58, as shown. A decoupling capacitor 60 is connected across the supply lines 62 and 64, as shown.

In the circuit for the oscillator 46, the bias for the transistor 46 is provided by the diodes 48 and 50 so as to hold the base voltage at about 1.2 volts negative of the positive supply. The resistor 58 is preferably on the order of one-hundred fifty ohms and stabilizes the emitter current at about 4MA. This bias circuit keeps the average emitter current relatively constant through a wide range of voltage supply values and temperatures whether the transistor 46 is oscillating or not. The coils 36 and 38 provide a feedback path by way of the inductive link and, accordingly, this feedback path is modulated by the rotation of the interrupter teeth 28 through the air gap between the coils 36 and 38 in accordance with the description of FIGS. 1 and 2, previously given. When there is no metal between the coils, the circuit will operate as a normal oscillator with the collector voltage swing of about ten volts peak-to-peak and at a frequency of about 300 KC, assuming a supply voltage of approximately fourteen volts. With one of the metallic teeth 28 between the coils 36 and 38, the coupling between the coils is substantially shielded and the transistor 46 stops oscillating, thus, giving rise to a voltage on the collector electrode essentially at ground potential.

The output circuit for the transistor 46 comprises a diode 66 connected to the collector and a series resistor 68. A bandpass filter comprises resistor 70 with capacitors 72 and 74 connected to ground at opposite ends thereof. The output of the filter circuit is connected to the base electrode of an output transistor 76 having a base bias resistor 78. The emitter circuit of transistor 76 is grounded and the collector electrode is connected to the supply voltage through a resistor 80.

When transistor 46 oscillates, current flows into the base of transistor 76 causing it to saturate. When the oscillation of transistor 46 is stopped, the transistor 76 switches off and the output voltage on the collector terminal of transistor 76 rises to the supply voltage. Other pulse-forming circuits may, of course, be employed in various ways to receive the basic timing signal which is generated by the coils 36 and 38 in conjunction with the interrupter teeth 28.

The dwell angle control is shown in FIG. 4 and consists of the variable resistor 57 connected across the sensor coil 38 and its associated shunt capacitor 58 to form a parallel RLC circuit. This resistor, when varied, acts so as to control the gain of the oscillator circuit associated with transistor 46, by damping to a greater or lesser extent the oscillations in the collector circuit. This improvement can be seen to be desirable for the following reasons.

In a production run of the oscillator coils 36 and 38, the relative spacing of, and therefore coupling between, the coils will vary due to mechanical and electrical changes from unit to unit. These coupling changes will act to alter the gain in the oscillator circuit. These changes in gain have the result that from circuit to circuit the coils will vary in their sensitivity to the metallic teeth of the interrupter disc, so that the duration of the electric current through the ignition coil (commonly called the "dwell angle") will vary from unit to unit. The variable resistor enables the gain of the oscillator circuit to be adjusted on each unit to give the desired value of dwell, so eliminating the need for unusually accurate tolerance in the assembly of the sensor coils.

A further advantage to come from this improvement is that if the resistor is constructed so as to be variable by an electronic signal (such methods being well known to those skilled in electronics; e.g., a lamp-photocell combination) then the dwell angle of the current through, and also timing of the spark from, the ignition coil can be varied by the electronic signal. The electronic signal could be derived from, for instance, a sensor 82 in the exhaust system, so connected to vary the dwell timing as to minimize by real-time feedback undesirable pollutants in the exhaust gases. Alternatively, the electronic signal could be derived from a temperature, engine speed, intake vacuum, engine load, or carburetor sensor, and then applied to the variable resistor in such a way as to improve engine performance or fuel economy, or to minimize undesirable pollution effects.

Other combinations of sensors and ignition dwell and timing will doubtless be evident to those skilled in the art; those selected demonstrate the advantages which can be obtained from the electronic variation of the dwell angle.

FIG. 5 discloses an embodiment of the circuit of FIG. 4 wherein all of the electronic components are fabricated according to contemporary miniaturization techniques, commonly referred to as chips, and encapsulated to form a crescent-shaped body 84 of potting compound with the various electronic component chips buried therein. The encapsulation body is mounted on a crescent-shaped plate 86 having fastener holes 87 and 88 so as to permit the body 84 and plate 86 to be mounted on the distributor in the manner illustrated for element 40 in FIG. 1. The coils 36 and 38 in the circuit of FIG. 4 are within the body 84 and wound on magnetic flux trapping ferrite bars 90 which project above the body 84 in FIG. 5 to form the air gap for the teeth 28 of the interrupter band 29. Alternatively, the coils could be flat, as in the printed circuit form, projecting above the encapsulated body 84. Input and output lead lines 92 are provided for electrical connection to the positive terminal of the supply source and the ignition coil respectively.

It is to be understood that while the circuit of FIG. 4 is illustrated as suitable for use in connection with the invention, the invention is not limited to any particular circuit and in fact may be embodied in magnetically responsive circuits having but a single coil which is disposed in a position to be proximate the interrupter teeth as they rotate therepast. Such a circuit may comprise a simple magnetic arrangement responsive to the ferromagnetic interrupter teeth or it may comprise an electromagnetic arrangement wherein magnetic reluctance is varied by the presence and absence of the interrupter teeth in the area adjacent the coil.

One of the features of the device of FIG. 5 is that it prevents would-be thieves from obtaining electrical connection to the ignition system components for the purpose of car theft. Another feature of the device of FIG. 5 is that the body 84 may be provided with an allen wrench socket 94 which receives the end of a conventional allen wrench and which is directly associated with one or more of the ignition system tuning components 57, 56 or 38 to manually vary engine timing. This provides a convenient point of access for mechanics and owners for varying dwell time and during engine tune up. For example, socket 94 may be mechanically connected to vary a resistor 57 in the circuit of FIG. 4 to vary dwell time.

Looking now to FIG. 6 an anti-theft circuit is disclosed which comprises means for substantially detuning the dwell timing circuitry so as to render the engine inoperable unless a key 98 is fully inserted into a conventional ignition tumbler lock 96. The embodiment of FIG. 6 has for its objective the defeat of auto theft attempts where no ignition key is placed in the ignition lock 96 or where the ignition lock is knocked out in an effort to steal a car. This is accomplished by means of a proximity switch or limit switch 100 which is tripped only when the key 98 is fully inserted into the lock 96. Once the switch 100 is tripped the circuit is completed from a voltage source such as the battery to a heater coil 102 which is disposed operatively adjacent a bimetallic reed 104. The reed 104 is connected in parallel with the engine timing resistor 57 and a timing capacitor 56 so as to short-circuit the timing components 56 and 57 until the bimetal is warped sufficiently by the heater 102 so as to open the contacts which comprise the shunt circuit.

Thus, the ignition key 98 must be inserted fully into the lock 96 for a sufficient period to heat the bimetallic strip 104 until it bends away from the associated contact. As long as the bimetallic element 104 is in the straight or cooled condition, the engine timing circuit is electrically short-circuited and is thus so substantially detuned that the engine may not be started. As one of several variations on this circuit, the strip 104 may be placed in series with the resistor 57 and normally open circuited, again for the purpose of detuning the ignition timing to the point of inoperability until an ignition key is inserted or even turned to an unlocked position.

Figure 8:
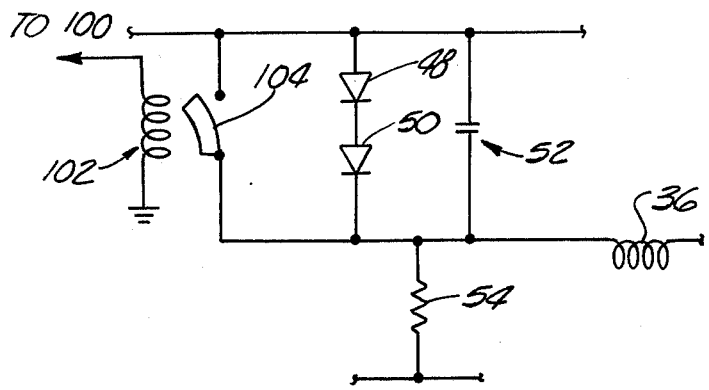
FIG. 8 is a circuit illustrative of an alternative to my anti-theft device.

Alternatively, the bimetallic element 104 can operate to alter the bias condition of the oscillator 46. This can be accomplished by connecting the bimetallic element 104 across the series diodes 48 and 50 as shown in FIG. 8, thereby preventing the correct bias condition from obtaining unless the bimetallic element 104 is in the opened position.

Figure 9:
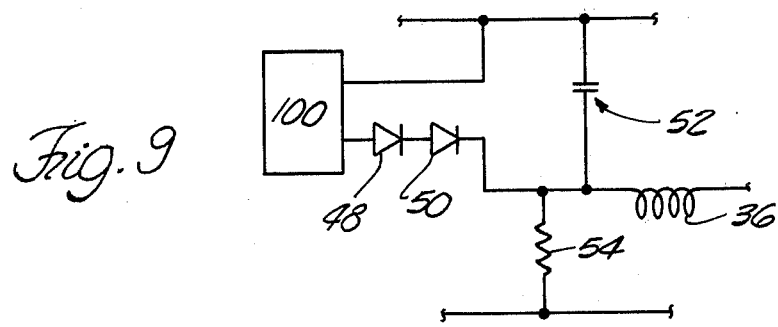
FIG. 9 is a circuit illustrative of a simplified version of my anti-theft device.

Another alternative is to eliminate the heater coil 102 and bimetallic element 104 entirely and connect the limit switch 100 directly into the bias network of the oscillator 46 as shown in FIG. 9. Thus, proper bias conditions are not obtained unless the limit switch 100 is closed by insertion of the ignition key 98 into the lock 96. Under this arrangement, the series diodes 48 and 50 should be enclosed with the limit switch 100 so as to eliminate the possibility of defeating the circuit by simply shorting the wires between the limit switch 100 and the electronic unit.

FIG. 7 shows a modification of the interrupter 29' having teeth 28' but wherein the interrupter is not adapted to be either encapsulated or otherwise molded into a rotor cap. Interrupter 29' comprises opposing and radially inwardly projecting tabs 106 having fastener holes so as to be compatible with the screws 32 which secure the rotor cap 14 to the mounting plate 24 in the embodiment of FIGS. 1 and 2. Thus, with the interrupter 29' of FIG. 7, the standard rotor cap may be employed and the modification from a standard distributor is thus rendered less expensive and more convenient. It will be understood from the foregoing that the installation of the interrupter 29' of FIG. 7 involves the removal of the standard rotor cap, the placement of the interrupter 29' over the plate 24, the placement of the cap 14 over the interrupter and the securement of all three elements; i.e., cap 14, interrupter 29' and plate 24 by means of screws 32.

FIG. 7 also discloses a further modification of the invention wherein each of teeth 28' of the interrupter band is associated with a separate set of timing circuitry such that the timing and/or spark excitation waveshape of each cylinder in a multicylinder engine may be individually varied. This, of course, permits exceptionally fine tuning and may be employed with high-performance engines and engines utilizing fuel injection techniques as well as with standard passenger car engines. In the circuit of FIG. 7, the tooth bearing the number 3 is associated with the number 3 cylinder in the engine and is electrically associated with the circuit 108. Circuit 108 comprises variable resistor 57", capacitor 56", and coil 38" all of which function in exactly the same manner as described with reference to the like components in the circuit of FIG. 4. Similarly, tooth bearing the number 6 is associated with the number 6 cylinder of the engine and is electrically associated with the circuit 110. Note that the circuits 110 and 108 are electrically interconnected through switches 118 to prevent interaction and to minimize circuitry requirements in the output portion of the pulse forming circuit. A counter 116, consisting merely of an 8-bit shift register, counts ignition pulses and progressively renders switches 118 conductive to sequentially connect in the series of eight timing circuits. Other approaches may, of course, be employed. For example, a single-tooth interrupter may be used in combination with a plurality of circumferentially spaced coils, each coil being associated with its own timing circuit and a particular cylinder of the engine.

Figure 10:
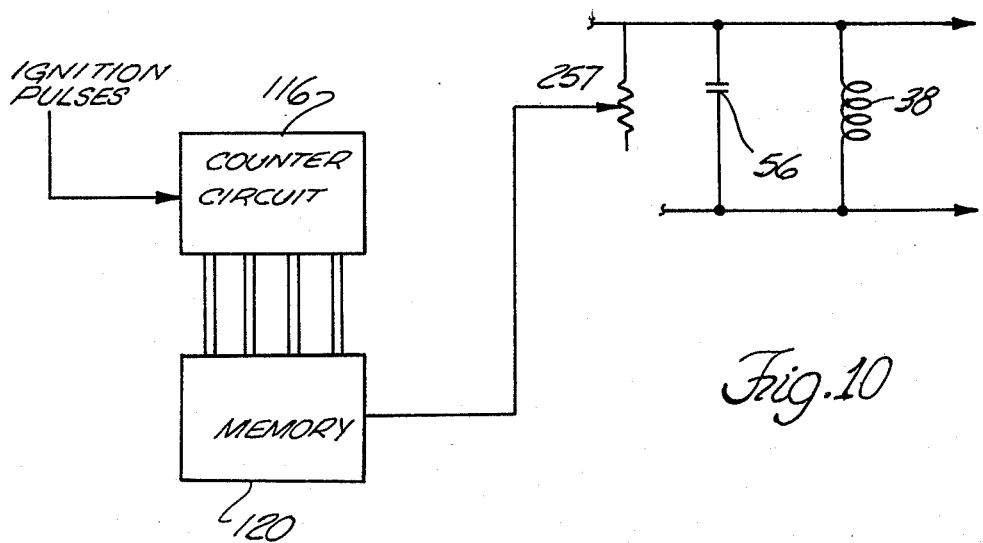
FIG. 10 is a schematic circuit illustrative of an alternative timing circuit for individually tuning each cylinder.

Another alternative is to use the counter circuit 116 to address a read-only memory 120 as shown in FIG. 10. The memory 120 is programmed such that each of the eight input addresses produces an output voltage representing in analog form the optimum ignition tuning and dwell setting for each cylinder, and automatically outputs the optimum voltage to a voltage-variable resistor 257 for each period of ignition in the eight cylinders of an engine. Thus, the variable resisitor 257 will be electronically adjusted to its optimum setting for each cylinder as the counter 116 progressively counts the ignition pulses. The program in the ROM can be manually inserted into the memory 120, or may be derived from an external electronic sensor 82 of the type disclosed above. The read-only memory 120 consists of a single integrated circuit chip and is commercially available from several manufacturers. A typical example is the chip manufactured by Signetics, manufacturing No. 8223.

It is to be understood that the various features of this invention including the anti-theft device, the encapsulated electronics, the separately installable interrupter band, and the individual cylinder timing circuits may all be used in combinations or separately, the principal objective of this invention being the incorporation of means whereby the timing pulses may be varied thereby to vary engine ignition timing in a convenient fashion. It will further be understood that the circuit of FIG. 4 is illustrative of automatic external engine timing variation from one or more sources whereas the embodiment of FIG. 5 is representative of the fact that engine timing may be varied in a manual and fixed setting fashion. Again, these techniques may be used in combination with one another as well as alone.

It should be understood that the subject invention has been disclosed with reference to a specific embodiment selected to represent the best present mode of carrying out the invention and that various alternative apparatus including mechanical components and circuitry may be employed.

The embodiments of the invention in which an exclusive property or privilege is claimed are defined as follows:

1. An automative ignition system for a multicylinder engine comprising a distributor element rotatable in proportion to engine speed, interrupter means mounted for rotation with said member, a tunable timing circuit, actuator means responsive to the proximity of said interrupter means and operatively associated with said timing circuit to produce an ignition timing signal quantity, addressable memory means operatively associated with said timing circuit and responsive to input addresses to tune said timing circuit so as to optimize said timing signal quantity produced thereby, and means for selectively progressively addressing said memory means for the ignition times of each cylinder of said engine.

2. An automotive ignition system for a multi-cylinder engine having spark igniters comprising: a plurality of timing signal circuits equal in number to the number of cylinders in the engine, an output circuit commonly electrically connected to all of the timing signal circuits and adapted for connection to the igniters, means responsive to engine rotation to produce an electrical timing signal quantity in each of said circuits in succession and means in each of said timing signal circuits for electronically adjusting said circuit parameters individually adjusting the time-position of the timing signal quantity occurrence relative to engine rotation.

3. An automotive ignition system for a multicylinder engine of the type having spark igniters and comprising: a plurality of timing signal circuits equal in number to the of cylinders in the engine, a common output circuit for connection to the igniters, first means responsive to engine rotation to produce an electrical timing signal quantity in each of said circuits in sequence, and second means responsive to engine rotation to sequentially operatively interconnect said timing signal circuits to said output circuit in a sequence which is synchronized with engine rotation, each of said timing signal circuits including tuning means electronically varying parameters of said tuning signal circuits for individually fine tuning the time position of the timing signal quantity produced therein relative to engine rotation.

4. Apparatus as defined in claim 3 wherein said second means comprises a counter circuit having a single input for advancing the condition thereof and multiple outputs, and gate means connected to be controlled by the outputs of said counter and having primary terminals individually interconnecting the timing signal circuits with the common output circuit.

* * * * *